United States Patent
Ishikawa (10) Patent No.: US 8,661,939 B2
(45) Date of Patent: Mar. 4, 2014

(54) WAVE GEAR DEVICE HAVING COMPOUND TOOTH PROFILE OF POSITIVE DEFLECTION MESHING

(75) Inventor: Shoichi Ishikawa, Yokohama (JP)

(73) Assignee: Harmonic Drive Systems Inc., Shinagawa-Ku, Tokyo (JP)

( * ) Notice: Subject to any disclaimer, the term of this patent is extended or adjusted under 35 U.S.C. 154(b) by 359 days.

(21) Appl. No.: 13/060,830

(22) PCT Filed: Aug. 29, 2008

(86) PCT No.: PCT/JP2008/002361
§ 371 (c)(1),
(2), (4) Date: Feb. 25, 2011

(87) PCT Pub. No.: WO2010/023710
PCT Pub. Date: Mar. 4, 2010

(65) Prior Publication Data
US 2011/0154928 A1    Jun. 30, 2011

(51) Int. Cl.
*F16H 55/08*    (2006.01)
(52) U.S. Cl.
USPC .............................. 74/640; 74/462
(58) Field of Classification Search
USPC ......................... 74/640, 457, 462
See application file for complete search history.

(56) References Cited

U.S. PATENT DOCUMENTS

| | | | |
|---|---|---|---|
| 2,906,143 A | | 9/1959 | Musser |
| 5,458,023 A | * | 10/1995 | Ishikawa et al. ............. 74/640 |
| 6,526,849 B1 | * | 3/2003 | Ishikawa ..................... 74/640 |
| 6,799,489 B2 | * | 10/2004 | Ishikawa ..................... 74/640 |
| 2005/0044986 A1 | * | 3/2005 | Ishikawa ..................... 74/640 |
| 2007/0022838 A1 | | 2/2007 | Ishikawa |

(Continued)

FOREIGN PATENT DOCUMENTS

| EP | 622566 A1 | * 11/1994 | ............ F16H 1/32 |
|---|---|---|---|
| EP | 1566201 | 8/2005 | |

(Continued)

OTHER PUBLICATIONS

Parvizi, J. et al.; Low-intensity Untrasound Stimulates Proteoglycan Synthesis in Rat Chondrocytes by Increasing Aggrecan Gene Expression; J. Orthop. Res.; 1999; vol. 17; pp. 488-494.

(Continued)

*Primary Examiner* — David M Fenstermacher
*Assistant Examiner* — Terence Boes
(74) *Attorney, Agent, or Firm* — Buchanan Ingersoll & Rooney PC (57) ABSTRACT

In a wave gear device (1), radial deflection of a flexible external gear (3) is set at $2\kappa mn$ ($\kappa>1$) which is larger than a normal deflection of $2nm$ ($\kappa=1$), and the tooth depth of both gears (2, 3) is set larger than a standard tooth depth (in case of $\kappa=1$). Meshing movement locus of both gears (2, 3) is approximated by a rack in case of $\kappa>1$, and using similarity-transformation curves (AC, AD) obtained by similarly enlarging a curve (AB) on the unmeshing side at the post-stage of meshing from the vertex (deepest meshing position)(A) of the movement locus (M), the dedendum tooth profile portion (21) of a rigid internal gear (2) and the addendum tooth profile portion (31) of the flexible external gear (3) are defined and then both gears (2, 3) are brought into continuous contact.

6 Claims, 9 Drawing Sheets

(56) References Cited

U.S. PATENT DOCUMENTS

| | | |
|---|---|---|
| 2007/0180947 A1* | 8/2007 | Ishikawa et al. ............... 74/640 |
| 2007/0266819 A1* | 11/2007 | Ishikawa et al. ............... 74/640 |
| 2007/0299539 A1 | 12/2007 | Othman et al. |
| 2008/0060466 A1* | 3/2008 | Ishikawa ..................... 74/457 |
| 2011/0154928 A1* | 6/2011 | Ishikawa ..................... 74/461 |

FOREIGN PATENT DOCUMENTS

| | | |
|---|---|---|
| JP | 45-41171 | 12/1970 |
| JP | 63-115943 A1 | 5/1988 |
| JP | 64-79448 A | 3/1989 |
| JP | 7-167228 A | 7/1995 |
| JP | 2007-211907 A | 8/2007 |
| WO | 03/089581 | 10/2003 |
| WO | WO 2005/043006 A1 | 5/2005 |
| WO | WO 2005/121597 A1 | 12/2005 |
| WO | WO 2005/124189 A1 | 12/2005 |
| WO | 2010/022509 | 3/2010 |

OTHER PUBLICATIONS

Lin, L. et al.; Ultrasound-Induced Physiological Effects and Secondary Metabolite (Saponin) Production in Panax ginseng Cell Cultures; Ultrasound in Med. & Biol.; 2001; vol. 27, No. 8; pp. 1147-1152.

Yoon, Jong Hyun et al.; Introducing Pulsed Low-Intensity Ultrasound to Culturing Human Umbilical Cord-Derived Mesenchymal Stem Cells; Biotechmol Lett; 2009; vol. 31; pp. 329-335.

International Search Report (PCT/ISA/210) issued on Sep. 30, 2008, by Japanese Patent Office as the International Searching Authority for International Application No. PCT/JP2008/002361.

* cited by examiner

WAVE GEAR DEVICE HAVING COMPOUND TOOTH PROFILE OF POSITIVE DEFLECTION MESHING

TECHNICAL FIELD

The present invention relates to a wave gear device, and particularly relates to a wave gear device in which the tooth profiles of a rigid internally toothed gear and a flexible externally toothed gear are modified so as to obtain high strength and high ratcheting torque.

BACKGROUND ART

The wave gear device was invented by C. W. Musser (Patent Document 1), and since that time, a variety of inventions concerning wave gear devices have been made by many researchers, including Musser and the present inventor. A variety of inventions relating to the tooth profiles of wave gear devices have also been proposed. For example, the present inventor has proposed making the basic tooth profile an involute tooth profile (Patent Document 2), and has also proposed a tooth profile design method for deriving the addendum tooth profile of two gears in contact over a wide area by using a technique in which tooth meshing of the rigid internally toothed gear and the flexible externally toothed gear is approximated by a rack (Patent Documents 3, 4). The present inventor has also proposed an invention aimed at avoiding tooth profile interference caused by rack approximation (Patent Document 5).

The present inventor has further proposed a tooth profile provided with a large tooth depth and a wide meshing region in order to prevent ratcheting at the time of a high load torque in a wave gear device having a high reduction ratio and including over 160 teeth in the two gears (Patent Document 6).

[Patent Document 1] U.S. Pat. No. 2,906,143
[Patent Document 2] JP-B 45-41171
[Patent Document 3] JP-A 63-115943
[Patent Document 4] JP-A 64-79448
[Patent Document 5] JP-A 7-167228
[Patent Document 6] WO2005/043006 pamphlet

DISCLOSURE OF THE INVENTION

Problems to be Solved by the Invention

There is demand for further improvements to a tooth profile in order to prevent ratcheting at the time of a high load torque in a wave gear device having a high reduction ratio and including over 200 teeth in the two gears.

In order to respond to this demand, the tooth depth must be made as large as possible, the meshing region of the rigid internally toothed gear and the flexible externally toothed gear must be enlarged, and the contact pressure between the tooth profiles of the two gears must be reduced to increase torque capacity.

In light of such points, an object of the present invention is to provide a wave gear device having a tooth profile that can be provided with a large tooth depth, a wide meshing region, and the ability to reduce the contact pressure of the two gears in order to prevent ratcheting at the time of a high load torque.

Means Used to Solve the Above-Mentioned Problems

In order to solve the aforementioned problems, according to the present invention, there is provided a wave gear device having an annular rigid internally toothed gear, a flexible externally toothed gear disposed inside the internally toothed gear, and a wave generator set inside the externally toothed gear, wherein the flexible externally toothed gear includes a flexible cylindrical body part and an annular diaphragm extending in the radial direction from a back end of the cylindrical body part, and wherein a tooth part formed in a region of the cylindrical body part on the side near a front end opening part is deflected in an elliptic shape over a section extending from a back end part on the side near the diaphragm to a front-end part on the side near the opening, by the wave generator so that deflection occurs substantially proportionate to the distance from the diaphragm; the wave gear device characterized in that:

the rigid internally toothed gear is formed as a spur gear having a module m;

the flexible externally toothed gear is formed as a spur gear having a module m;

the number of teeth of the flexible externally toothed gear is smaller by a quantity of 2n (where n is a positive integer) than the number of teeth of the rigid internally toothed gear;

deflection of the major axis of the elliptic rim neutral line of the flexible externally toothed gear is set to $2\kappa mn$ ($\kappa>1$) in a cross section that is perpendicular to the axis (hereinafter referred to as the principal cross section) and that is selected at a given position of the teeth of the flexible externally toothed gear in the tooth trace direction;

tooth meshing of the rigid internally toothed gear and the flexible externally toothed gear is approximated by rack meshing in the principal cross section to calculate the movement locus of the teeth of the flexible externally toothed gear in relation to the teeth of the internally toothed gear in association with the rotation of the wave generator;

a curve portion is obtained from a part of the movement locus that extends from the major axis of the deepest meshing position of the two gears to the side where tooth meshing is released, so that the curve portion starts at the deepest meshing position of the two gears, which is the position where the angle of inclination is 90°, and reaches the position at which the angle of inclination in the movement locus relative to the radial line of the rigid internally toothed gear is $\alpha°$ ($0°<\alpha°<30°$); and a principal part of a tooth profile of the flexible externally toothed gear is defined by a first similarity-transformation curve in which the curve portion is enlarged by a multiple of $\lambda$, and by a straight line smoothly connected to an endpoint of the first similarity-transformation curve;

a principal part of a tooth profile of the rigid internally toothed gear is defined by a second similarity-transformation curve in which the curve portion is enlarged by a multiple of $(\lambda+1)$, and by a straight line smoothly connected to an endpoint of the second similarity-transformation curve; and the value of $\lambda$ is smaller than the maximum value of $\lambda$, wherein the maximum value of $\lambda$ is obtained when the curve portion is multiplied by $(\lambda+1)$ with the origin of similarity transformation of the curve portion being set on the deepest meshing position so that the distal end of the second similarity-transformation curve is positioned on the movement locus.

In practical terms, a value within the range of from 0° to 15° is generally adopted for the range of the angle of inclination $\alpha°$.

The range of a straight-line part in an addendum tooth profile of the rigid internally toothed gear is preferably set at a maximum value up to a value at which there is interference by a tooth top of the addendum tooth profile of the flexible externally toothed gear.

In order to enlarge a root part of the rigid internally toothed gear, the tooth profile portion that is near the root and along the second similarity-transformation curve that defines a dedendum part of the rigid internally toothed gear is preferably modified to a shape of a tooth profile formed of an arc having a curvature radius larger than that of the second similarity-transformation curve, and a straight line connected to the arc.

The end of a straight line that defines the dedendum side of the tooth profile of the flexible externally toothed gear is preferably connected to a root circle via an arc in order to maintain top clearance of a tooth top of the rigid internally toothed gear.

The tooth part of the flexible externally toothed gear is subjected to relieving at least in the portion from the principal cross section to the front-end part on the side near the opening.

The present invention can be used for a wave gear device having a high reduction ratio and including over 200 teeth each on the rigid internally toothed gear and the flexible externally toothed gear.

Effect of the Invention

In the wave gear device according to the present invention, the tooth depth of the teeth of the rigid internally toothed gear and the flexible externally toothed gear is related to deflection of the flexible external gear. Therefore, deflection of the flexible externally toothed gear in the radial direction is set at $2\kappa mn$ ($\kappa>1$), which is larger than the normal deflection of $2mn$ ($\kappa=1$), and the tooth depth of the two gears is set larger than a standard tooth depth (tooth depth when $\kappa=1$).

The meshing movement locus of the teeth of the two gears is approximated by a rack in the case of $\kappa>1$, and the principal parts of the dedendum tooth profile of the rigid internally toothed gear and the addendum tooth profile of the flexible externally toothed gear are defined using curves obtained by similarly enlarging a curve on the side where meshing is released at a post-stage of meshing from the deepest meshing position, which is the vertex of the movement locus of the rack. The two gears are thereby brought into continuous contact with each other.

The contact pressure of the teeth is reduced and the torque capacity is increased by adopting a compound tooth profile in which the tooth profiles of the two gears are defined by the first and second similarity-transformation curves and the straight-line tooth profiles smoothly connected to the end-points of the similarity-transformation curves.

According to the present invention, there is provided a wave gear device having a tooth profile that allows the tooth depth to be increased, the meshing region to be enlarged, and the contact pressure to be lowered. The present invention is thereby made particularly suited for use in a wave gear device having a high reduction ratio and including over 200 teeth in the two gears.

SYMBOLS

1 Wave gear device
2 Rigid internally toothed gear
3 Flexible externally toothed gear
4 Wave generator
20 Tooth profile of rigid internally toothed gear
21 Similarity-transformation curve tooth profile portion
22, 25 Arc
23 Straight line
24 Straight-line tooth profile portion
30 Tooth profile of flexible externally toothed gear
31 Similarity-transformation curve tooth profile portion
32 Straight line
33 Straight-line tooth profile portion
34 Arc
35 Root circle
300 Position of principal cross section
301a Back end
301b Opening end
304 External tooth
304a Back end part in tooth trace direction
304b Front-end part in tooth trace direction
M Movement locus
AB Curve portion used to set tooth profile
AC First similarity-transformation curve
AD Second similarity-transformation curve
A Deepest position of movement locus
B Point at which the angle of inclination of a tangent to the movement locus is $\alpha$

BEST MODE FOR CARRYING OUT THE INVENTION

A wave gear device employing the present invention will be described below with reference to the drawings.
(Configuration of Wave Gear Device)

Figure 1:
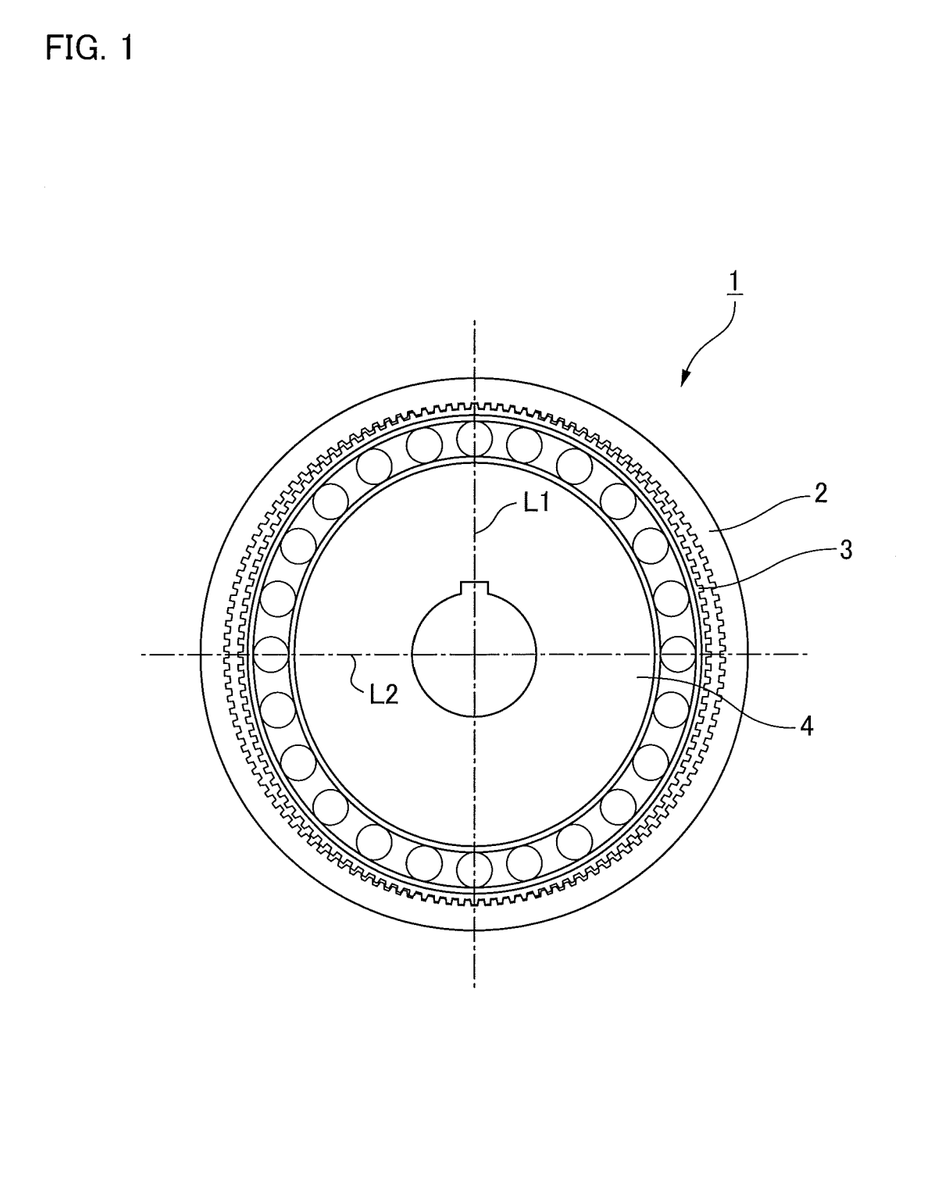
FIG. 1 is a schematic front view of a wave gear device, which is the object of the present invention.
Figure 2:
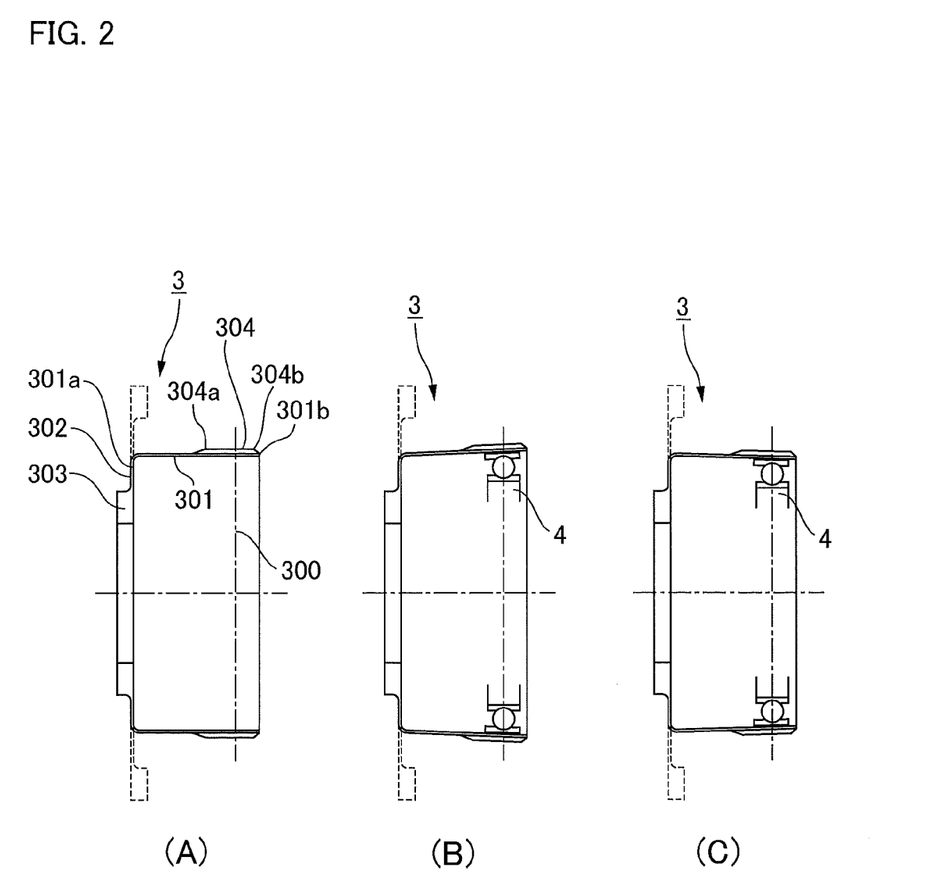
FIG. 2 is an explanatory view showing the deflected condition of a flexible externally toothed gear in a cross section through an axis, where (A) shows the state prior to deformation, (B) shows a cross section including the major axis after elliptical deformation, and (C) shows a cross section including the minor axis after elliptical deformation.

FIG. 1 is a front view of a wave gear device, which is the object of the present invention. FIGS. 2(A) to 2(C) are cross-sectional views showing the flexible externally toothed gear of the wave gear device in which the opening part is deflected in an elliptic shape in a cross section through an axis. FIG. 2(A) shows a state prior to deformation, FIG. 2(B) shows a cross section including the major axis of the elliptic form after deformation, and FIG. 2(C) shows a cross section including the minor axis of the ellipse after deformation. The solid lines in FIGS. 2(A) to 2(C) show a flexible externally toothed gear shaped as a cup, and the dashed lines show a flexible externally toothed gear shaped as a top hat.

A wave gear device 1 has an annular, rigid internally toothed gear 2, a flexible externally toothed gear 3 disposed inside the gear 2, and an elliptically profiled wave generator 4 fitted inside the gear 3, as shown in the drawings. The difference in the number of teeth between the rigid internally toothed gear 2 and the flexible externally toothed gear 3 is 2n (where n is a positive integer). The flexible externally toothed gear 3 of the wave gear device 1 is deflected in an elliptic form by the elliptically profiled wave generator 4 and is meshed with the rigid internally toothed gear 2 at both ends portions of the elliptic form in the direction of the major axis L1. The meshing position of the two gears 2, 3 moves in a circumferential direction when the wave generator 4 is rotated, and a relative rotation that corresponds to the difference in the number of teeth of the two gears is produced between the two gears 2, 3. The flexible externally toothed gear 3 has a flexible cylindrical body part 301, a radially widening diaphragm 302 continuous with a back end 301a of the body part 301, a boss 303 continuous with the diaphragm 302, and external teeth 304 formed in the portion of the external circumferential surface of the cylindrical body part 301 on the side near an opening end 301b.

Deflection to the outside or inside in the radial direction is gradually increased from the back end 301a on the diaphragm side of the cylindrical body part 301 toward the opening end 301b by the elliptically profiled wave generator 4 fitted in the portion on the internal circumferential surface of the section of the cylindrical body part 301 in which the external teeth are formed. Deflection to the outside is gradually increased in proportion to the distance from the back end 301a to the opening end 301b in the cross section that includes the major axis L1 of the elliptic form, as shown in FIG. 2(B); and deflection to the inside is gradually increased in proportion to the distance from the back end 301a to the opening end 301b in the cross section that includes the minor axis L2 of the elliptic form, as shown in FIG. 2(C). For the external teeth 304 formed in the portion of the external circumferential surface on the side near the opening end 301b as well, deflection is therefore gradually increased from a back end part 304a in the tooth trace direction toward a front-end part 304b on the side near the opening in proportion to the distance from the back end 301a of the cylindrical body part.

(Formation Method of Tooth Profile in Principal Cross Section)

Figure 3:
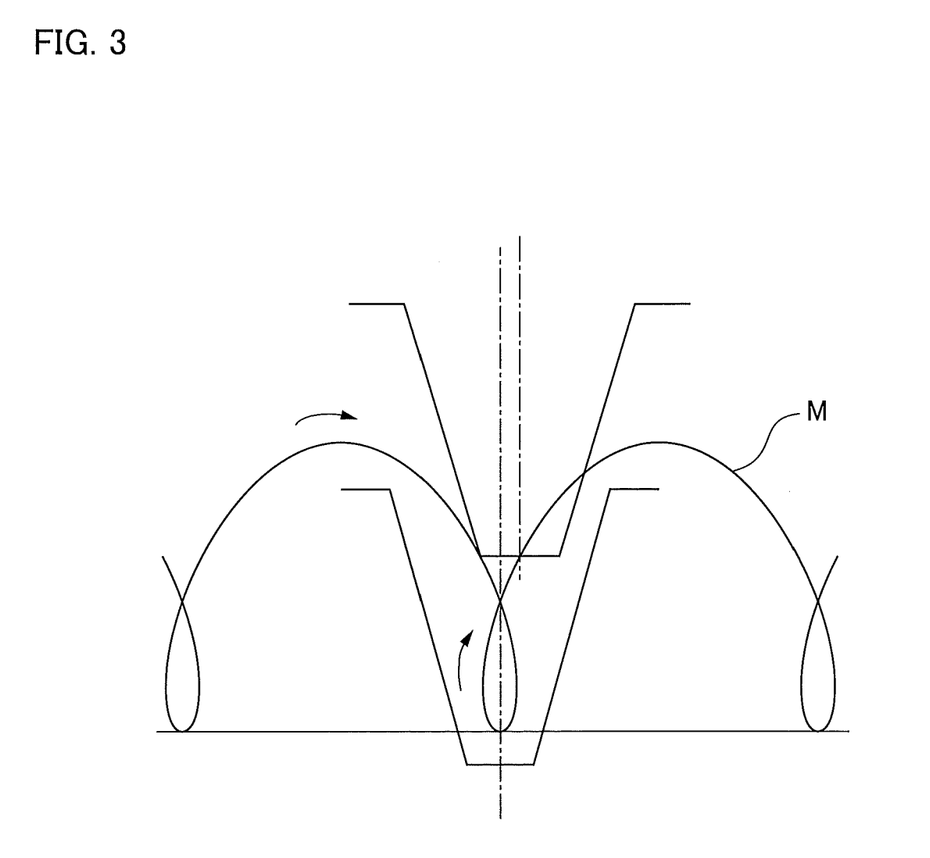
FIG. 3 is a movement locus of a rack when $\kappa>1$, which constitutes the basis for forming a tooth profile according to the present invention.

FIG. 3 is a view showing a movement locus of a tooth of the flexible externally toothed gear 3 in relation to the rigid internally toothed gear 2, where the movement locus is obtained when the relative movement of the two gears 2, 3 of the wave gear device 1 is approximated by a rack. The movement locus M is obtained in a principal cross section (the cross section perpendicular to an axis and selected at a given position of the external teeth 304 of the flexible externally toothed gear 3 in the tooth trace direction), which constitutes the basis for forming the tooth profiles of the two gears. For example, the principal cross section is set to a cross section positioned as shown by a straight line 300 passing through the center of a ball in the bearing of the wave generator 4, as can be seen in FIG. 2(A). The movement locus M of a tooth of the gear 3 is given by the following formulas.

$$x = 0.5mn(\sigma - \kappa \sin \theta)$$

$$y = \kappa mn(1 - \cos \theta)$$

Here, κ is a deflection coefficient larger than 1, and m is a module. The total amplitude of the movement locus M of the flexible externally toothed gear 3 is 2κmn.

Figure 4:
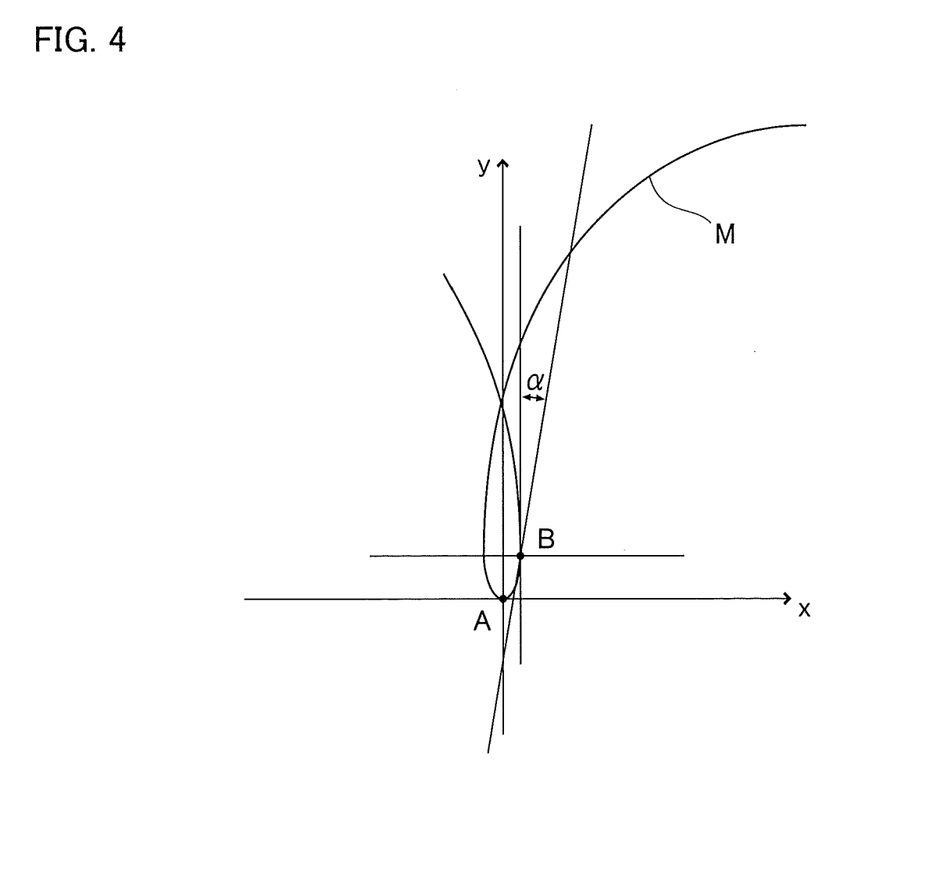
FIG. 4 is an explanatory view showing the range used for the formation of a tooth profile within the movement locus of FIG. 3.

FIG. 4 is an explanatory view showing the working range set for the loop portion of the movement locus M of a tooth. Curve portion AB is adopted for the section that extends from point A, which is the deepest meshing part, to the part where meshing is released. The curve portion reaches point B, which has angle α°, and extends from point A of the deepest position, which is the position where the angle of inclination (pressure angle) of a tangent to the movement locus M relative to the y-axis (radial line of the rigid internally toothed gear) is 90 degrees (x-axis). Angle α° corresponds to the smallest pressure angle of the resulting tooth profile. More specifically, α° corresponds to the smallest pressure angle of the addendum in the flexible externally toothed gear and to the smallest pressure angle of the dedendum in the rigid internally toothed gear. The range of angle α° is usually 0°<α<30°, and is 0°<α<15° in practice. A tooth profile is determined using curve portion AB as described in the following. In positive deflection (κ>1) meshing, there is no contact until the teeth of the flexible externally toothed gear 3 enter the tooth grooves of the rigid internally toothed gear 2 and reach the deepest position A, and contact with the tooth surface of the internally toothed gear 2 occurs only at the release side where meshing is released.

Figure 5A:
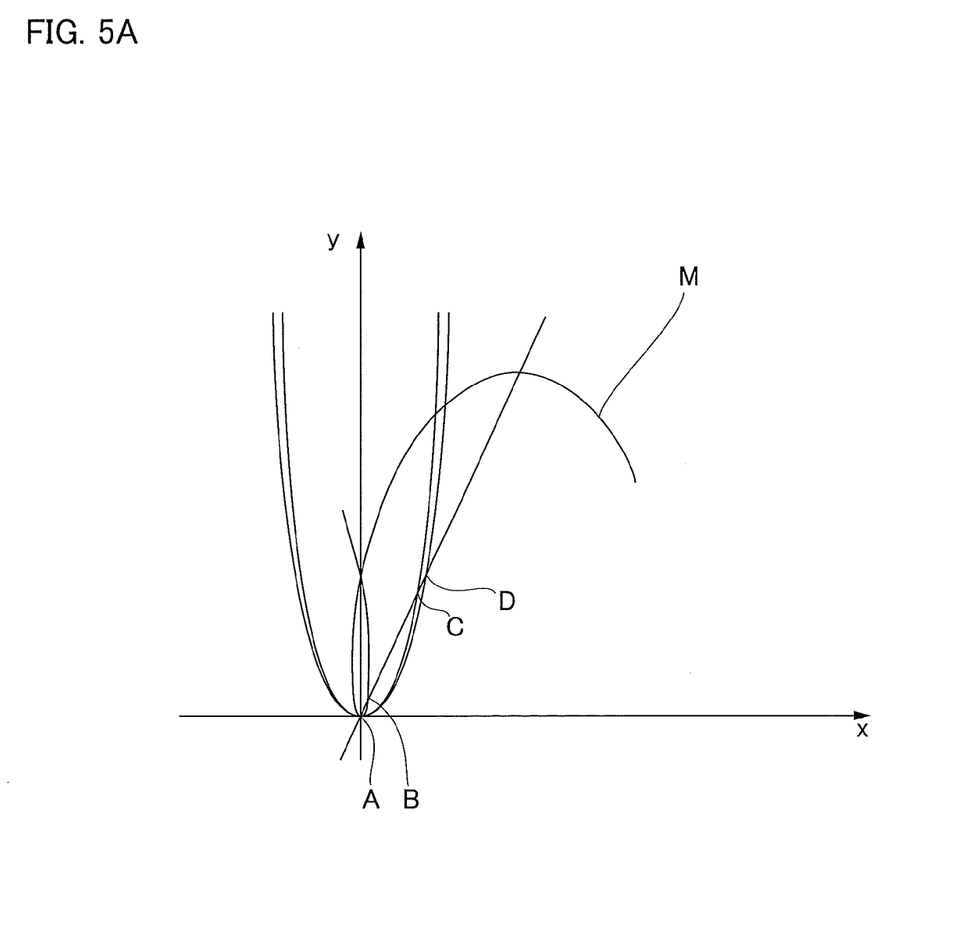
FIG. 5A is an explanatory view showing an example of similarity-transformation curves used for setting tooth profiles for the two gears.
Figure 5B:
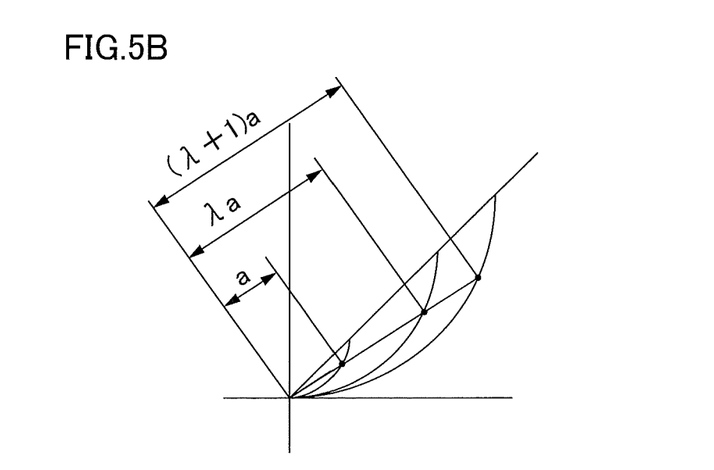
FIG. 5B is an explanatory view showing similarity-transformation curves.

A first similarity-transformation curve AC which is obtained by subjecting the movement locus of the working range, that is, curve portion AB, to similarity transformation with multitude of λ, is adopted as the tooth profile of the principal part of the addendum tooth profile of the flexible externally toothed gear 3, as shown in FIG. 5A. A second similarity-transformation curve AD which is obtained by subjecting curve portion AB to similarity transformation with multitude of (λ+1), is adopted as the tooth profile of the principal part of the dedendum tooth profile of the rigid internally toothed gear 2. The two tooth profiles determined in this way can be continuously meshed within curve portion AB due to similar qualities, as shown by the principle in FIG. 5B.

Figure 5C:
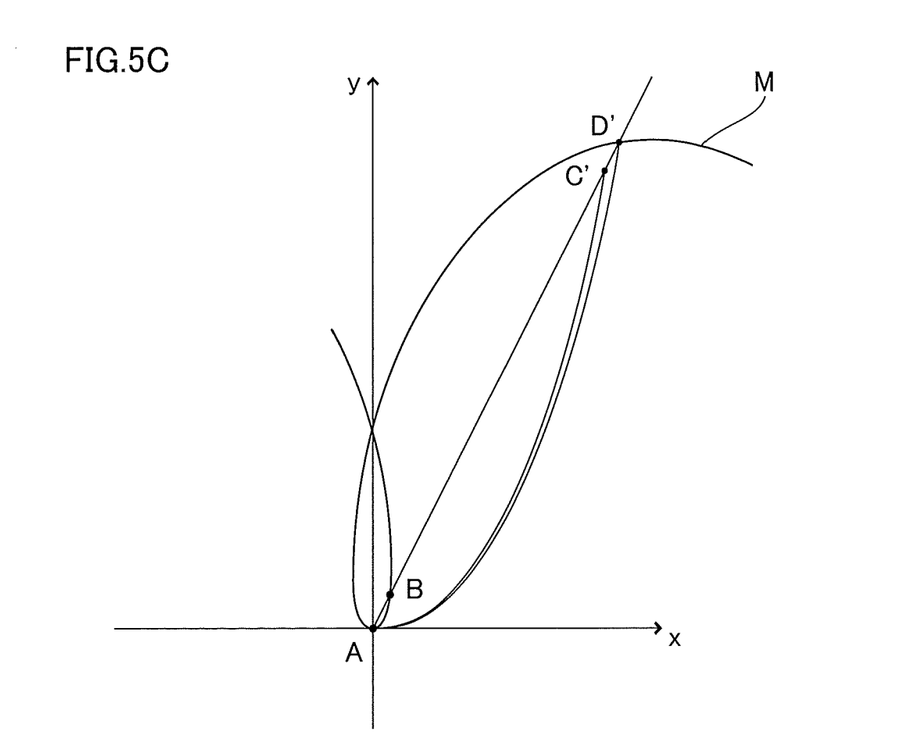
FIG. 5C is an explanatory view showing similarity-transformation curves when $\lambda$ is set to the maximum value.

The tooth depth must be increased as much as possible in order to increase ratcheting torque. In order to accomplish this, λ is increased as much as possible. The maximum value is the position D' in which the tooth top of the rigid internally toothed gear 2 is on the top of the movement locus M. The tooth tops of the two gears interfere with each other when the value is larger than D'. Such an instance is shown in FIG. 5C. The maximum value of λ reaches an extreme value in cases in which the tooth top of the rigid internally toothed gear 2 is selected as the location of the maximum amplitude of the movement locus M. Tooth profile contact is point contact and lacks sufficient strength when the maximum value is adopted as the value of λ.

In this embodiment, therefore, a value slightly below the maximum value is adopted as the value of λ while the advantages of a tooth depth that is better than the standard tooth depth are maintained. An approach is also adopted in which the principal portion of the tooth profile of the two gears is defined by a compound tooth profile formed of a similarity-transformation curve tooth profile and a straight-line tooth profile by smoothly connecting a straight line at the endpoints of the similarity-transformation curves of each of the two gears. The surface pressure of the tooth can thereby be lowered, and strength-related improvements can be attained.

The value of angle θ (parameter) and angle α (pressure angle) relating to the maximum theoretical value of λ+1 (in this case, without the straight-line part of the compound tooth profile) can be calculated using the following formula.

$$\tan \alpha = dx/dy = 0.5(1-\kappa \cos \theta)/(\kappa \sin \theta)$$

The scaling factor ($\lambda+1$) of the movement locus M is the following value.

From the x-coordinate value, $$\lambda+1 = 0.5mn(\pi-\kappa \sin 180°)/0.5mn/(\theta-\kappa \sin \theta) = \pi/(\theta-\kappa \sin \theta).$$

From the y-coordinate value, $$\lambda+1 = 2\kappa mn/\kappa mn/(1-\cos \theta) = 2/(1-\cos \theta).$$

The value of $\theta$ can therefore be obtained from the above formula, and can be calculated using the following formula.

$$\theta-\kappa \sin \theta+0.5\pi \cos \theta-0.5\pi=0$$

For example, the values of $\theta$, $\alpha$, and $\lambda+1$ are as follows if the deflection coefficient is set to $\kappa=1.4$.

$$\theta=-26.1272°$$

$$\alpha=11.7712°$$

$$\lambda+1=19.5731°$$

Figure 6A:
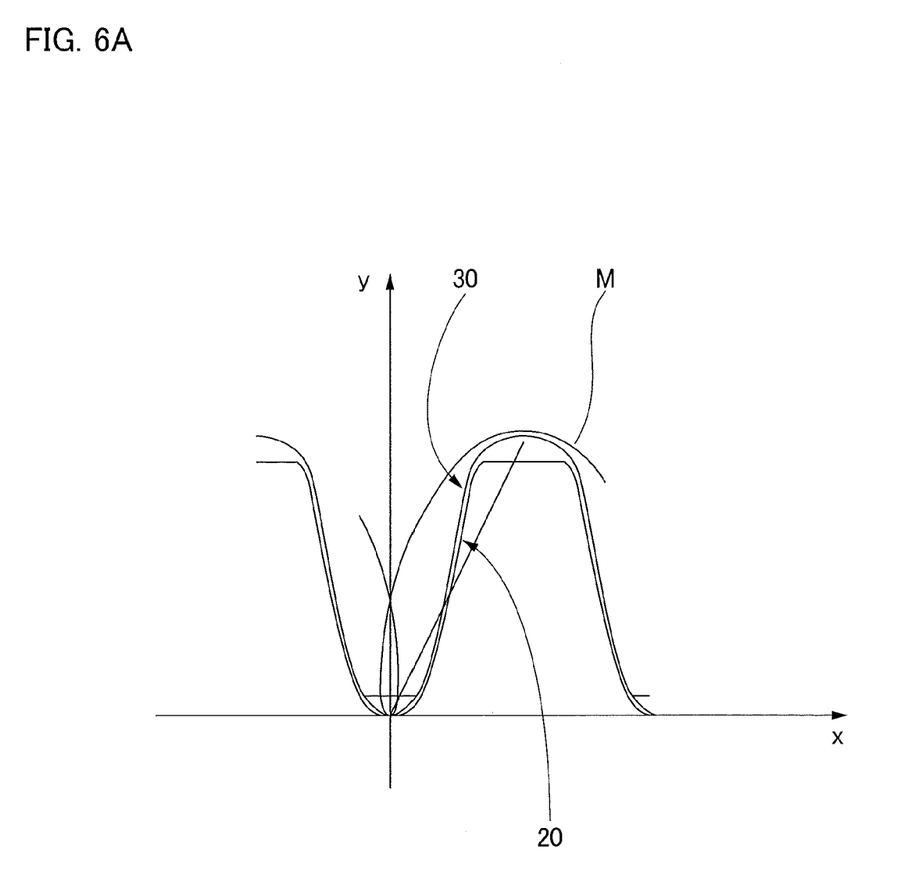
FIG. 6A is an explanatory view showing an example of tooth profiles of the two gears.
Figure 6B:
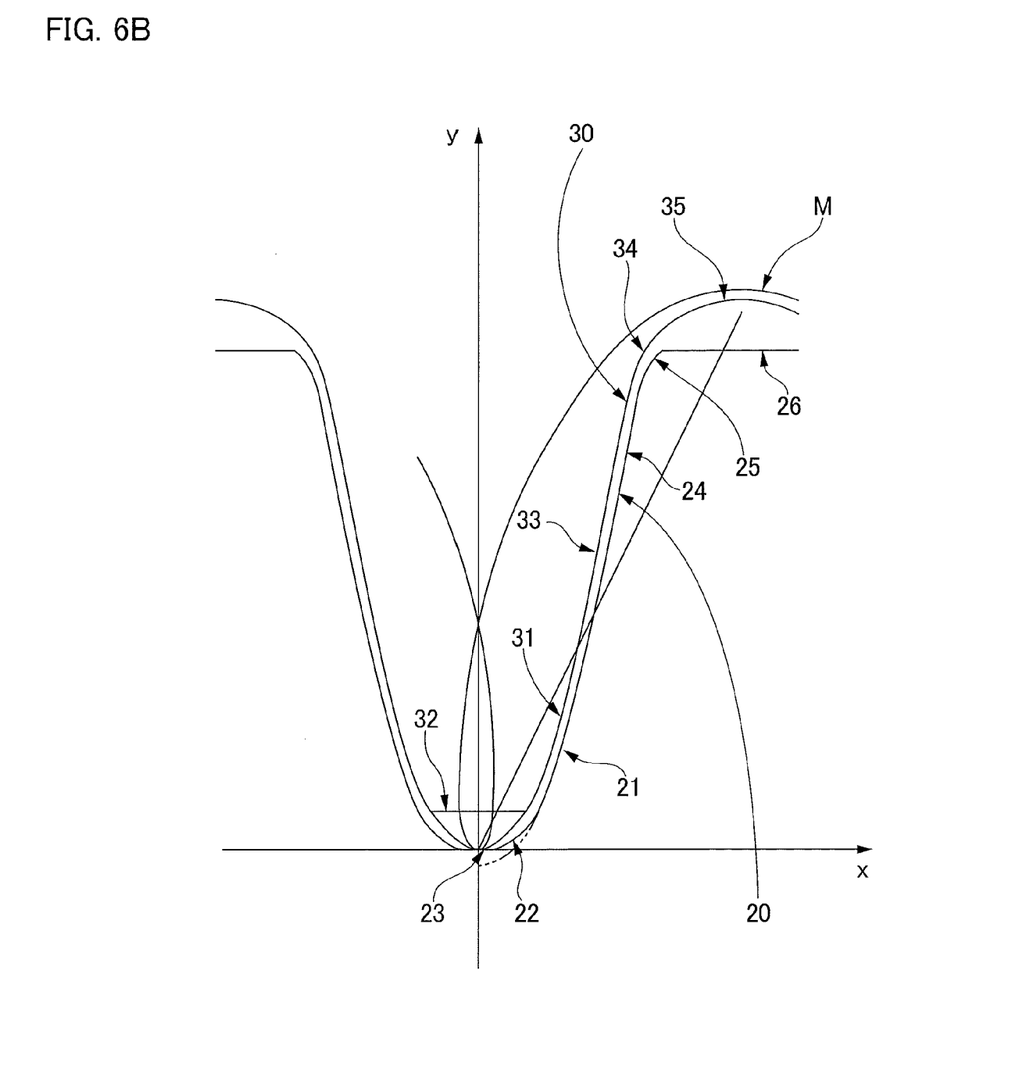
FIG. 6B is an explanatory view showing part of FIG. 6A in enlarged form.

FIGS. 6A and 6B are explanatory views showing an example of a tooth profile of a rigid internally toothed gear and a flexible externally toothed gear. In these drawings, the upper line is a tooth profile 30 of a flexible externally toothed gear, and the lower line is a tooth profile 20 of a rigid internally toothed gear.

In the principal part of the tooth profile 20 of the rigid internally toothed gear, the dedendum side is a similarity-transformation curve tooth profile portion 21 in which the similarity-transformation curve tooth profile defined by the second similarity-transformation curve AD is slightly adjusted, and the addendum side is a straight-line tooth profile portion 24 defined by a straight line that is smoothly connected to the similarity-transformation curve tooth profile portion 21. The portion of the second similarity-transformation curve AD in the vicinity of the root is adjusted by a straight line 23 and by an arc 22 in which one end is connected to the straight line 23 and the other end is smoothly connected to the similarity-transformation curve tooth profile portion 21 in order to enlarge the root in the dedendum part of the rigid internally toothed gear. Conversely, an arc 25 is smoothly continuous with the endpoint of the straight-line tooth profile portion 24 on the side near the addendum, the other end of the arc 25 is connected to a straight line 26 that extends perpendicular to the center line of the tooth of the rigid internally toothed gear, and the flat top land is defined by the straight line 26.

Here, the range of the straight-line tooth profile portion 24 in the addendum tooth profile of the rigid internally toothed gear is preferably set at the maximum value up to the value at which there is interference by the tooth top of the addendum tooth profile of the flexible externally toothed gear.

In the tooth profile 30 of the flexible externally toothed gear, the addendum side is a similarity-transformation curve tooth profile portion 31 defined by the first similarity-transformation curve AC, and the dedendum side is a straight-line tooth profile portion 33 defined by a straight line smoothly connected to the endpoint of the similarity-transformation curve tooth profile portion 31. A root circle 35 is smoothly connected to the endpoint of the straight-line tooth profile portion 33 on the dedendum side via an arc 34. Adequate top clearance with the flat top land of the rigid internally toothed gear is secured by the root circle 35, while the flat top land is defined by the straight line 32 extending perpendicular to the center line of the tooth, in the end of the similarity-transformation curve tooth profile portion 31 near the tooth top.

Figure 7:
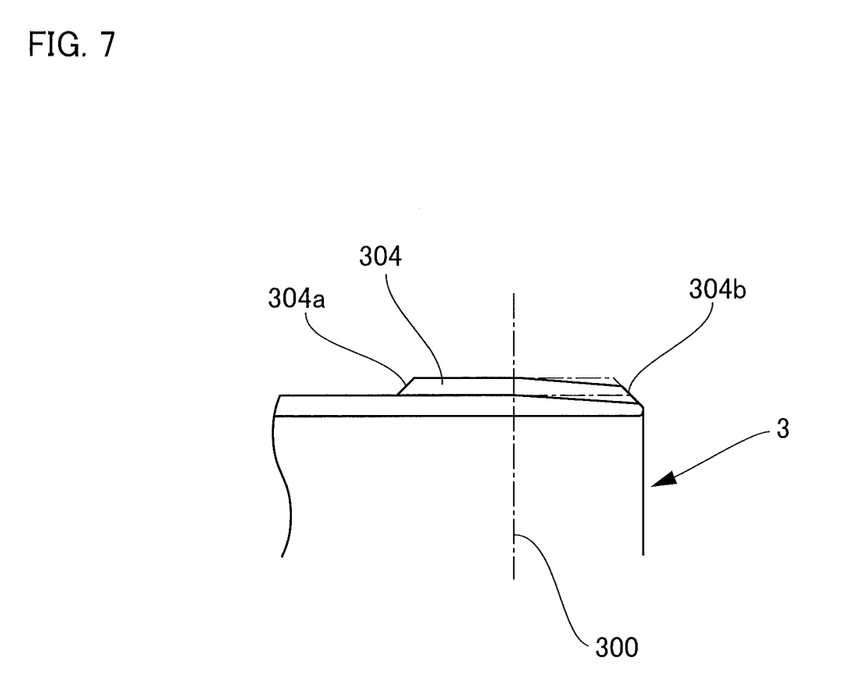
FIG. 7 is an explanatory view showing the relieving performed on a tooth of the flexible externally toothed gear.

Relieving that increases gradually toward the opening end 301b is performed the portion of the external teeth 304 of the flexible externally toothed gear 3 from the principal cross section (position shown by the line segment 300) to the front-end part 304b, as shown in FIG. 7. The resulting effect is that a preload is generated by the swelling of the movement locus of the external teeth 304 near the major axis in the portion of the external teeth 304 reaching from the principal cross section to the opening end 301b. Meshing interference is also prevented in the portion of the external teeth 304 near the diaphragm 302 and away from the principal cross section.

The invention claimed is:

1. A wave gear device having an annular rigid internally toothed gear, a flexible externally toothed gear disposed inside the internally toothed gear, and a wave generator set inside the externally toothed gear, wherein the flexible externally toothed gear includes a flexible cylindrical body part and an annular diaphragm extending in the radial direction from a back end of the cylindrical body part, and wherein a tooth part formed in a region of the cylindrical body part on the side near a front end opening part is deflected in an elliptic shape over a section extending from a back end part on the side near the diaphragm to a front-end part on the side near the opening, by the wave generator so that deflection occurs substantially proportionate to the distance from the diaphragm; the wave gear device having a positive deflection meshing compound tooth profile wherein:

the rigid internally toothed gear is formed as a spur gear having a module m;

the flexible externally toothed gear is formed as a spur gear having a module m;

a number of teeth of the flexible externally toothed gear is smaller by a quantity of 2n (where n is a positive integer) than a number of teeth of the rigid internally toothed gear;

deflection of a major axis of an elliptic rim neutral line of the flexible externally toothed gear is set to 2 $\kappa$mn ($\kappa>1$) in a cross section that is perpendicular to an axis (hereinafter referred to as a principal cross section) and that is selected at a given position of the teeth of the flexible externally toothed gear in a tooth trace direction;

tooth meshing of the rigid internally toothed gear and the flexible externally toothed gear is approximated by rack meshing in the principal cross section to calculate a movement locus of the teeth of the flexible externally toothed gear in relation to the teeth of the internally toothed gear in association with rotation of the wave generator;

a curve portion is obtained from a part of the movement locus that extends from the major axis of a deepest meshing position of the two gears to a side where tooth meshing is released, so that the curve portion starts at the deepest meshing position of the two gears, which is the position where an angle of inclination is 90°, and reaches a position at which the angle of inclination in the movement locus relative to a radial line of the rigid internally toothed gear is $\alpha°$ (0°<$\alpha°$<30°); and a principal part of a tooth profile of the flexible externally toothed gear is defined by a first similarity-transformation curve in which the curve portion is enlarged by a multiple of $\lambda$, and by a straight line smoothly connected to an endpoint of the first similarity-transformation curve;

a principal part of a tooth profile of the rigid internally toothed gear is defined by a second similarity-transformation curve in which the curve portion is enlarged by a multiple of ($\lambda$+1), and by a straight line smoothly connected to an endpoint of the second similarity transformation curve; and a value of $\lambda$ is smaller than a maximum value of $\lambda$, wherein the maximum value of $\lambda$ is obtained when the curve portion is subjected to similarity transformation of multitude ($\lambda$+1) with the origin of similarity transformation of the curve portion being set on the deepest meshing position so that a distal end of the second similarity-transformation curve is positioned on the movement locus.

2. The wave gear device according to claim 1, wherein the range of a straight-line part in an addendum tooth profile of the rigid internally toothed gear is set at a maximum value up to a value at which there is interference by a tooth top of the addendum tooth profile of the flexible externally toothed gear.

3. The wave gear device according to claim 1, wherein, in order to enlarge a root part of the rigid internally toothed gear, the tooth profile portion that is near the root and along the second similarity-transformation curve that defines a dedendum part of the rigid internally toothed gear is modified to a shape of a tooth profile formed of an arc having a curvature radius larger than that of the second similarity-transformation curve, and a straight line connected to the arc.

4. The wave gear device according toclaim 1, wherein the end of a straight line that defines the dedendum side of the flexible externally toothed gear is connected to a root circle via an arc in order to maintain top clearance of a tooth top of the rigid internally toothed gear.

5. The wave gear device according to claim 1, wherein the tooth part of the flexible externally toothed gear is subjected to relieving at least in a portion from the principal cross section to a front-end part on the side near the opening.

6. The wave gear device according to claim 1, wherein the number of teeth of the rigid internally toothed gear and the flexible externally toothed gear is greater than 200 each.

* * * * *